United States Patent
Takasawa

(10) Patent No.: US 7,826,330 B2
(45) Date of Patent: Nov. 2, 2010

(54) OPTICAL PICKUP DEVICE, OPTICAL DISC DEVICE AND PRISM

(75) Inventor: Takeharu Takasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 752 days.

(21) Appl. No.: 11/670,218

(22) Filed: Feb. 1, 2007

(65) Prior Publication Data

US 2007/0189145 A1    Aug. 16, 2007

(30) Foreign Application Priority Data

Feb. 14, 2006   (JP)   ............................. 2006-036992

(51) Int. Cl.
   *G11B 7/135*   (2006.01)
(52) U.S. Cl. ............................. 369/112.28; 369/112.09; 369/112.14; 369/112.21; 369/112.23
(58) Field of Classification Search ....................... None
See application file for complete search history.

(56) References Cited

U.S. PATENT DOCUMENTS

| | | | | |
|---|---|---|---|---|
| 5,132,950 | A * | 7/1992 | Sato et al. ................. | 369/44.14 |
| 6,327,238 | B1 * | 12/2001 | Nishiwaki et al. ......... | 369/112.21 |
| 6,414,930 | B1 * | 7/2002 | Shiono et al. ............. | 369/112.03 |
| 6,584,060 | B1 * | 6/2003 | Oohchida et al. ......... | 369/112.05 |
| 6,845,077 | B2 * | 1/2005 | Oohchida et al. ......... | 369/112.09 |
| 7,177,260 | B2 * | 2/2007 | Kim et al. ............... | 369/112.28 |
| 7,253,962 | B2 * | 8/2007 | Sano ....................... | 359/684 |
| 2001/0026409 | A1 * | 10/2001 | Kanai ..................... | 359/833 |
| 2002/0172133 | A1 * | 11/2002 | Kim et al. ............... | 369/112.19 |
| 2004/0067038 | A1 * | 4/2004 | Popovic et al. .......... | 385/146 |
| 2004/0149037 | A1 * | 8/2004 | Digonnet et al. ......... | 73/514.26 |
| 2007/0053632 | A1 * | 3/2007 | Popp ....................... | 385/26 |
| 2007/0227582 | A1 * | 10/2007 | Chen et al. ............... | 136/246 |

FOREIGN PATENT DOCUMENTS

| JP | 6-215413 | 8/1994 |
|---|---|---|
| JP | 3542065 | 4/2004 |

* cited by examiner

*Primary Examiner*—Joseph H. Feild
*Assistant Examiner*—Ifedayo Iluyomade
(74) *Attorney, Agent, or Firm*—Oblon, Spivak, McClelland, Maier & Neustadt, L.L.P.

(57) ABSTRACT

An optical pickup device includes: a light source; a collimator lens for converting a light beam emitted from the light source into parallel light; an objective lens for converging the light beam to the optical disc; an extending portion in which a light flux transversal width as the width of the parallel direction with respect to the information recording face of the optical disc of the light beam converted into the parallel light by the collimator lens is extended until a final light flux diameter as the diameter of the light beam at an incident time to the objective lens; and a prism in which a light flux longitudinal width as the width of a direction perpendicular to the information recording face of the optical disc of the extended light beam is extended until the final light flux diameter, and the light beam is emitted to the objective lens.

13 Claims, 7 Drawing Sheets

OPTICAL PICKUP DEVICE, OPTICAL DISC DEVICE AND PRISM

CROSS REFERENCES TO RELATED APPLICATIONS

The present invention contains subject matter related to Japanese Patent Application JP 2006-036992 filed in the Japanese Patent Office on Feb. 14, 2006, the entire contents of which being incorporated herein by reference.

BACKGROUND OF THE INVENTION

1. Field of the Invention

The present invention relates to an optical pickup device, an optical disc device and a prism, and is suitably applied to an optical disc device corresponding to e.g., CD (Compact Disc) and DVD (Digital Versatile Disc).

2. Background Art

An objective lens is formerly arranged in the downward direction of an optical disc mounted in a horizontal direction as an optical pickup in the optical disc device. A rising prism having a rising reflection angle θA set to 45° with respect to the horizontal direction of a rising reflection face is arranged further in the downward direction of this objective lens. A light beam emitted in the horizontal direction from a laser diode is deflected 90° by this rising prism. Thus, this light beam is irradiated to the optical disc through the objective lens.

In the optical pickup, thin formation is required as the optical disc device is made compact.

The above objective lens is moved in the vertical direction over a predetermined focus stroke range to retrieve a focusing point with respect to an information recording layer of the optical disc. Accordingly, in the vicinity of this objective lens, it is necessary to secure a space of this focus stroke range in addition to the thickness of the objective lens and the thickness of the rising prism arranged in the downward direction of the objective lens. The thickness of this objective lens vicinity determines the thickness of the entire optical pickup in many cases.

Therefore, there is a structure in which the optical pickup is thinly made by reducing the thickness of the rising prism by reducing the rising reflection angle θ in the rising prism (e.g., see JP-A-6-215413 (patent document 1)).

As shown in FIG. 7, the rising prism 4 in this optical pickup 1 refracts the light beam upward toward a reflection transmission face 4C by an incident face 4A, and reflects this refracted light beam downward toward a rising reflection face 4B by the reflection transmission face 4C. The rising prism 4 then reflects the reflected light beam in the upward direction toward the reflection transmission face 4C by the rising reflection face 4B. In the rising prism 4, an incident angle with respect to the reflection transmission face 4C of the light beam reflected on the rising reflection face 4B is a right angle equal to a critical angle or more. Therefore, this light beam is transmitted through the reflection transmission face 4C. As this result, the light beam is emitted in a direction perpendicular to the optical disc 100.

Thus, the rising prism 4 increases a descent angle of the light beam with respect to the horizontal direction at an incident time from the reflection transmission face 4C to the rising reflection face 4B, and can set a rising reflection angle θB to be less than 45°. Therefore, the thickness of the rising prism 4 can be reduced, and the optical pickup 1 can be thinly made in comparison with the former rising prism of rising reflection angle θA=45°.

Further, there is an optical pickup set to be made thinner near this objective lens (e.g., see Japanese Patent No. 3542065 (patent document 2)). As shown in FIG. 8, similar to the above rising prism 4, a rising prism 6 in this optical pickup 7 emits the light beam incident by following an incident face 6A, a reflection transmission face 6C, a rising reflection face 6B and a reflection transmission face 6C.

At this time, the optical pickup 7 rotates and arranges the rising reflection face 6B of the rising prism 6 in a lowering direction, and greatly inclines the reflection transmission face 6C from the horizontal direction. The optical pickup 7 then transmits the light beam reflected from the rising reflection face 6B in a low position portion of the reflection transmission face 6C. Thus, the light beam can be emitted from a position lower than the upper end of a light flux of the light beam at an incident time point. Further, the height of the vicinity of the objective lens can be reduced by storing one portion of the objective lens 5 to a space generated by the inclination. As a result, the optical pickup 7 can be thinly made.

SUMMARY OF THE INVENTION

In such an optical pickup, a laser diode of a can type sealed in a package approximately formed in a cylindrical shape is used. This laser diode is arranged so as to form an oblong laser beam in which a divergent angle of the emitted light beam is large in the horizontal direction and is small in the vertical direction. In a position in which the light flux width of the horizontal direction of the light beam is enlarged until a final light flux diameter at the incident time to the objective lens, the light beam is converted into parallel light by a collimator lens.

Here, it is considered that the optical pickup can be further thinly made if the laser diode of a plate shape is used instead of the laser diode of the can type formerly mainly used.

However, in this laser diode, the light beam is emitted at a large divergent angle of the light beam with respect to a reducing direction of the thickness of this laser diode. Therefore, when the laser diode of the can type used in the former optical pickup is simply replaced with this laser diode, the optical pickup emits a longitudinal light beam from the laser diode. In a position in which the light flux width of the vertical direction of the light beam is enlarged until the final light flux diameter at the incident time to the objective lens, the light beam is converted into parallel light by the collimator lens.

As a result, in this optical pickup, the light beam becomes long in the vertical direction. Therefore, a problem exists in that the thickness of an optical part in an optical path is entirely increased, and it is difficult to thinly make the optical pickup.

In consideration of the above points, it is desirable to provide an optical pickup, an optical disc device and a rising prism able to realize thin formation of the optical pickup.

According to an embodiment of invention, there is provided an optical pickup device including: a light source for emitting a light beam having a divergent angle large in a vertical direction perpendicular to an information recording face of an optical disc and small in a parallel direction, in the parallel direction; a collimator lens for converting the light beam into parallel light; an extending portion in which a light flux transversal width as the width of the parallel direction of the converted light beam is extended until a final light flux diameter as the diameter of the light beam at an incident time to the objective lens; a rising prism in which a light flux longitudinal width as the width of a vertical direction of the extended light beam is extended until the final light flux diameter, and the light beam incident from the parallel direction is emitted in an upward direction; and an objective lens for irradiating the emitted light beam to the optical disc; wherein the collimator lens converts the light beam into the parallel light such that the light flux longitudinal width and the light flux transversal width in the light beam become smaller than the final light flux diameter.

Thus, the light flux longitudinal width of the light beam can be set to be smaller than the final light flux diameter in the entire optical path even when a light source having a large divergent angle of the light beam in the vertical direction is used. Thus, the thickness of an optical part of the optical path can be reduced.

Further, according to another embodiment of the invention, there is provided a rising prism for emitting a light beam incident in a parallel direction to an upward direction perpendicular to the parallel direction, and including: an incident face for refracting the incident light beam; a relay reflection face for reflecting the refracted light beam upward; a reflection transmission face for reflecting the light beam reflected on the relay reflection face in a position lower than an upper end of the incident light beam; and a rising reflection face on which the light beam reflected on the reflection transmission face is reflected upward so that the light beam reflected upward is transmitted through the reflection transmission face and is emitted in the upward direction; wherein the relay reflection face is inclined in a direction for reducing an incident angle of the refracted light beam.

Thus, a rising angle with respect to the parallel direction of the light beam reflected on the relay reflection face is reduced, and the optical path of the light beam reflected on the relay reflection face can be restricted to a low position. Therefore, the light beam reflected on the relay reflection face can be reflected in the position of a further downward direction on the reflection transmission face. Thus, the position of the reflection transmission face can be arranged in the downward direction.

In accordance with the embodiments of the invention, the light flux longitudinal width of the light beam can be set to be smaller than the final light flux diameter in the entire optical path even when a light source having a large divergent angle of the light beam in the vertical direction is used. Accordingly, the thickness of the entire optical path can be reduced. Thus, an optical pickup and an optical disc device for thinly making the optical pickup can be realized.

In accordance with the embodiments of the invention, the rising angle with respect to the parallel direction of the light beam reflected on the relay reflection face is reduced, and the optical path of the light beam reflected on the relay reflection face can be restricted to a low position. Therefore, the light beam reflected on the relay reflection face can be reflected in the position of a further downward direction on the reflection transmission face. Thus, the position of the reflection transmission face can be arranged in the downward direction. Thus, a rising prism, an optical pickup and an optical disc device for thinly making the optical pickup can be realized.

DESCRIPTION OF PREFERRED EMBODIMENTS

One embodiment mode of the invention will next be explained in detail with reference to the drawings.

(1) Entire Construction of Optical Disc Device

Figure 1:
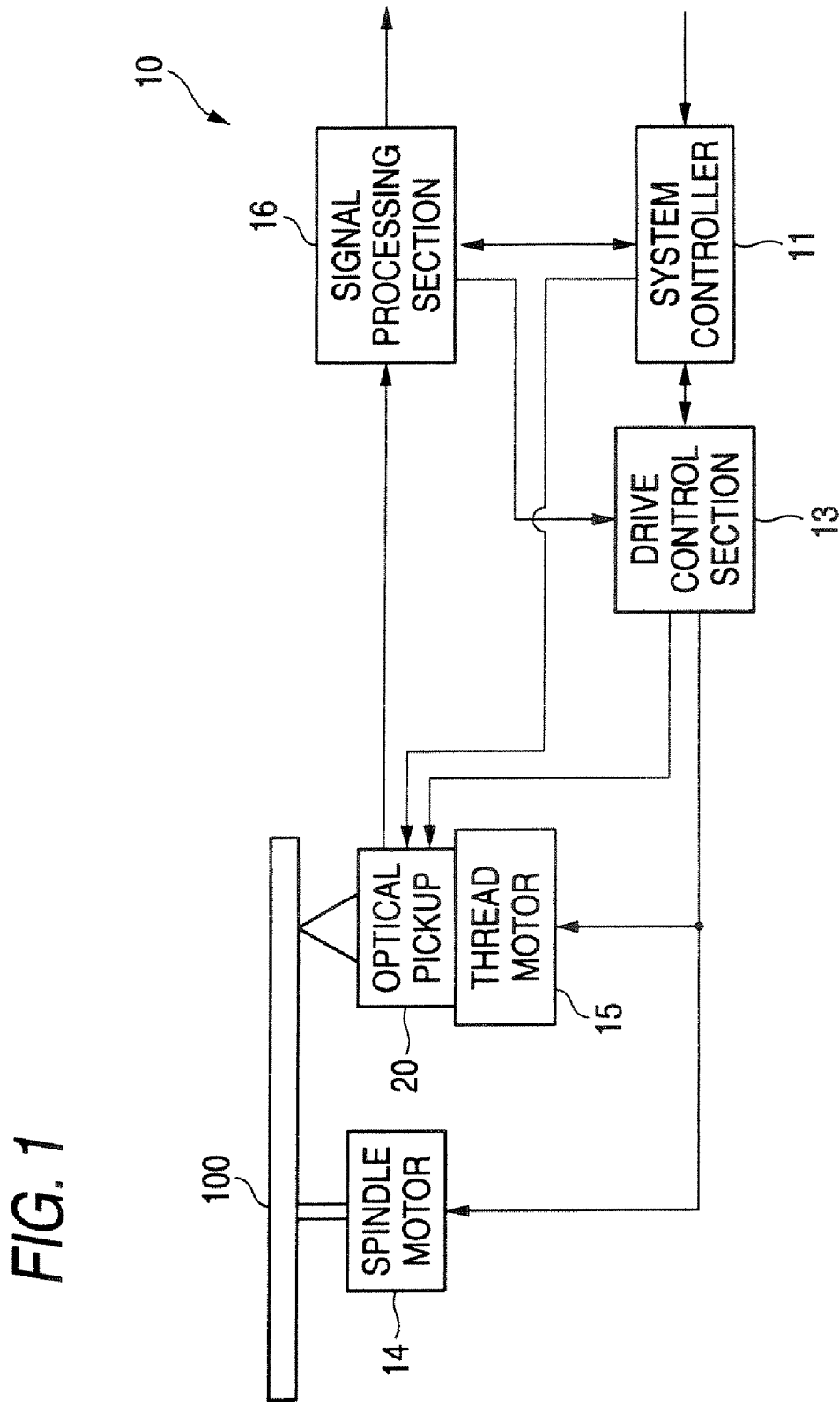
FIG. 1 is a schematic view showing the entire construction of an optical disc device.

In FIG. 1, reference numeral 10 designates an optical disc device corresponding to CD (Compact Disc) and DVD (Digital Versatile Disc) as a whole. This optical disc device 10 is generalized and controlled by a system controller 11, and is adapted to execute regeneration processing and recording processing with respect to an optical disc 100 of a CD or DVD system.

The system controller 11 sends-out a data reading command to a drive control section 13 together with address information for specifying data read out of the optical disc 100 in the regeneration processing.

The drive control section 13 rotates the optical disc 100 at a predetermined rotation speed by controlling the operation of a spindle motor 14 in accordance with the data reading command from the system controller 11. Further, the drive control section 13 moves an optical pickup 20 in a diametrical direction of the optical disc 100 by controlling the operation of a thread motor 15 on the basis of the data reading command and the address information. The system controller 11 then irradiates the light beam to the optical disc 100 by the optical pickup 20 with respect to a track according to the address information in an information recording layer of the optical disc 100.

At this time, the optical pickup 20 receives a reflection light beam provided by reflecting the light beam irradiated to the optical disc 100, and sends-out a light receiving signal according to its light amount to a signal processing section 16. On the basis of the light receiving signal, the signal processing section 16 generates a tracking error signal according to a shift amount of an irradiating position of the light beam with respect to a predetermined desirable track, and a focus error signal according to a shift amount of a focal point of the light beam with respect to the information recording layer of the optical disc 100. The signal processing section 16 then sends-out these error signals to the drive control section 13. Further, the signal processing section 16 generates a regeneration RF signal on the basis of the light receiving signal, and sends-out this regeneration RF signal to an unillustrated external device.

The drive control section 13 generates a tracking control signal and a focus control signal on the basis of the tracking error signal and the focus error signal, and sends-out these control signals to the optical pickup 20. In accordance with this sending-out, the optical pickup 20 performs tracking control and focus control, and conforms the focal point of the light beam to a predetermined desirable track of the optical disc 100.

The system controller 11 generates a laser power signal on the basis of the regeneration RF signal, and sends-out this laser power signal to the optical pickup 20. The optical pickup 20 controls the intensity of the light beam for emitting light by generating a laser power control signal on the basis of this laser power signal, and conforms this intensity to intensity suitable for regeneration.

The system controller 11 also sends-out a data writing-in command to the drive control section 13 together with the address information for designating a portion for recording data to the information recording layer of the optical disc 100 in the recording processing.

Further, the system controller 11 sends-out writing-in data inputted from the unillustrated external device, etc. to the optical pickup 20. The drive control section 13 further controls the position of the optical pickup 20 on the basis of the address information.

In accordance with this control, the optical pickup 20 conforms the focal point of the light beam to a track according to the address information in the information recording layer of the optical disc 100, and records the writing-in data to the optical disc 100 by irradiating the light beam adjusted to the intensity suitable for the record of data.

Thus, the optical disc device 1 can record and regenerate data by irradiating the light beam focused onto a predetermined desirable track in the information recording layer of the optical disc 100 from the optical pickup 20.

(2) Construction of Optical Pickup

Figure 2:
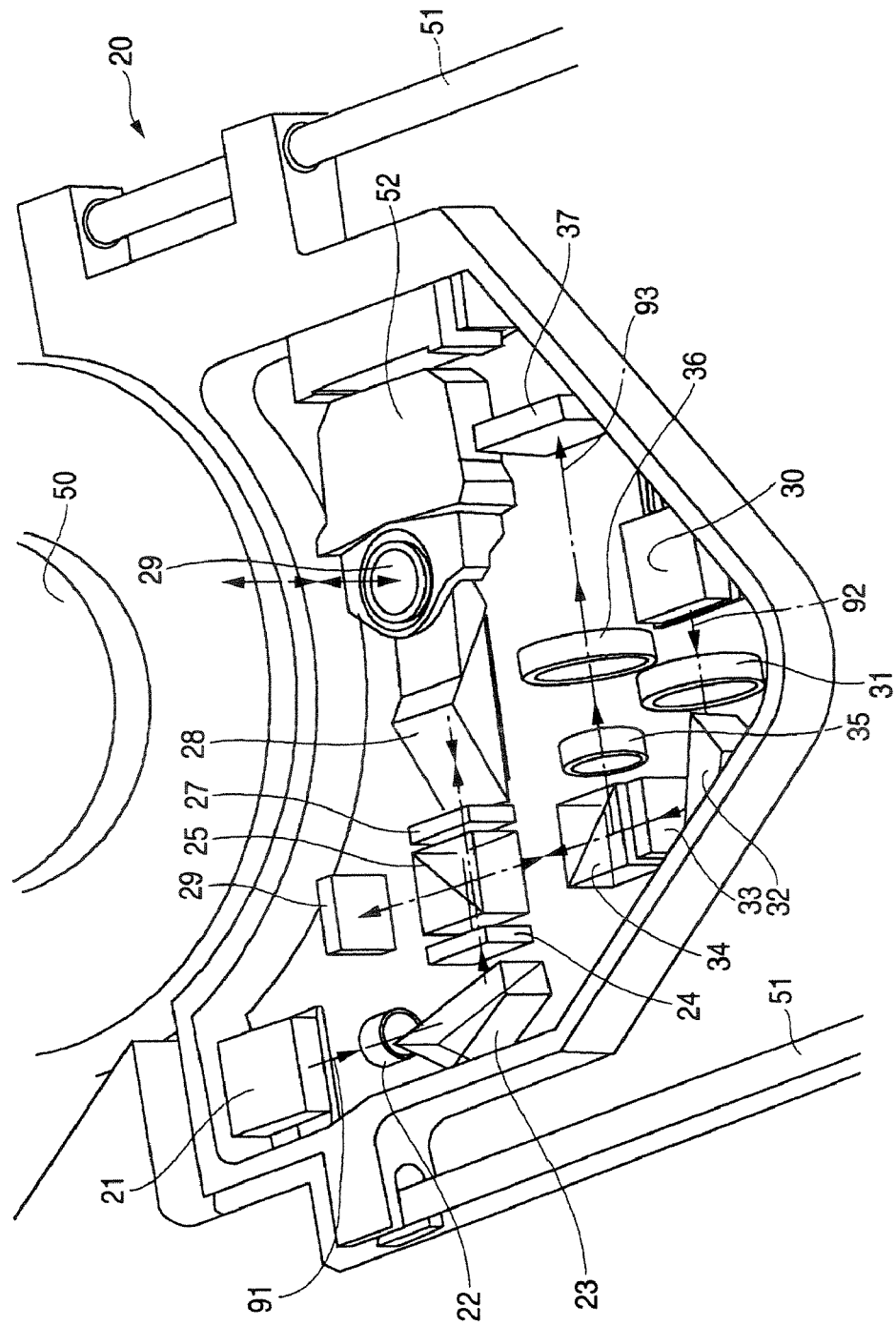
FIG. 2 is a schematic perspective view showing the construction of an optical pickup.

FIG. 2 shows the construction of the optical pickup 20. In this optical pickup 20, a central hole of the optical disc 100 as DVD or CD is fitted to a chuck 50 connected to the spindle motor 14 so that the optical disc 100 is mounted to cover an upper portion of the optical pickup 20. Further, in the optical pickup 20, the entire optical pickup 20 is operated along two guide shafts 51 by the thread motor 15 (FIG. 1), and an objective lens 29 is opposed to the predetermined desirable track with respect to the optical disc 100 by displacing the objective lens 29 by an actuator 52.

This optical pickup 20 has a laser diode 21 for DVD and a laser diode 30 for CD. For example, these two laser diodes 21, 30 are a thin type laser diode of a thin plate shape of about 1.4 mm to 1.8 mm in thickness, and emit the light beam in the horizontal direction as a direction parallel to a face (information recording face) of the information recording layer of the optical disc 100.

Two light beams respectively emitted from these two laser diodes 21, 30 are incident to separate optical paths as light beams 91, 92, and then pass the same optical path on the way, and are irradiated from the same objective lens 29 to the optical disc 100. On the other hand, a reflection light beam 93 provided by reflecting the light beams 91, 92 on the optical disc 100 passes one optical path, and is received by one photodiode 37.

In reality, the laser diode 21 for DVD emits the laser beam in accordance with the laser power signal supplied from the system controller 11 (FIG. 1), and this laser beam is incident to a collimator lens 22 as the light beam 91. The collimator lens 22 converts the light beam 91 as divergent light into parallel light, and makes this light beam 91 incident to a refracting prism 23.

Here, as mentioned above, the light beam 91 emitted from the laser diode 21 has a so-called longitudinal light flux in which its divergent angle is small in the horizontal direction and is large in the upward-downward direction as the vertical direction.

Figure 7:
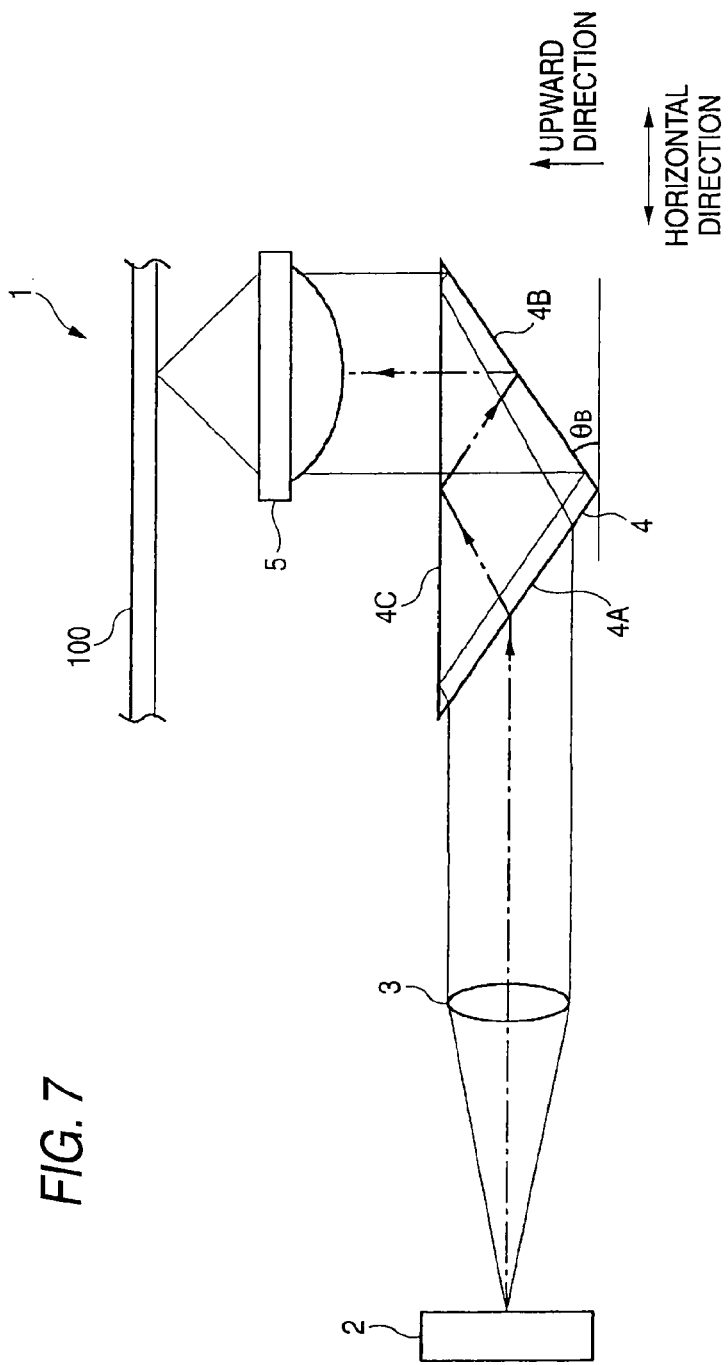
FIG. 7 is a schematic view showing the construction (1) of a former thin type optical pickup.
Figure 8:
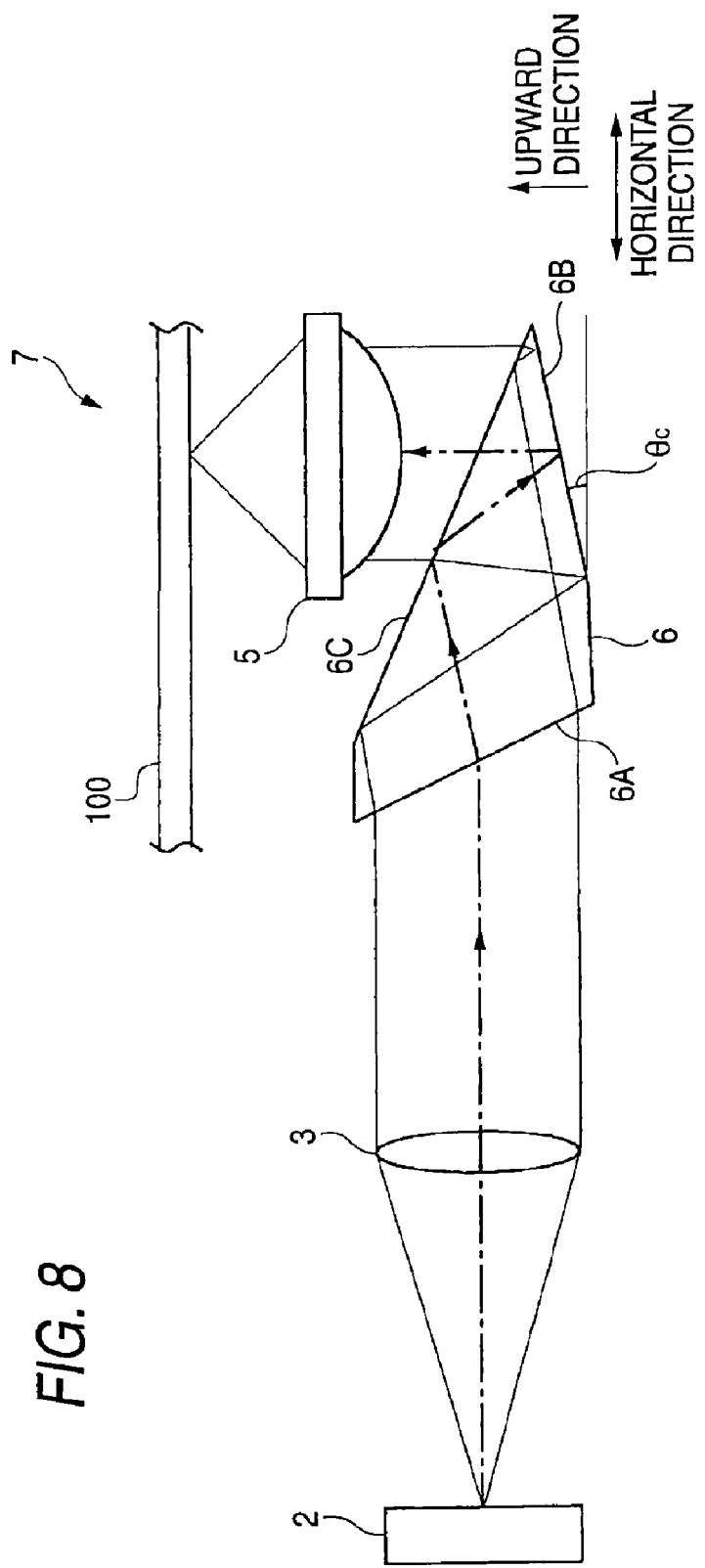
FIG. 8 is a schematic view showing the construction (2) of a former thin type optical pickup.

The optical pickup 20 sets a focal distance of the collimator lens 22 to about 5 mm shorter than the focal distance of the collimator lens 3 (FIGS. 7 and 8) in the former optical pickups 1 and 7. The light beam is converted into parallel light before the light beam 91 is greatly diverged, i.e., in a state smaller than a final light flux diameter Df as the diameter of the light beam 91 when both a light flux longitudinal width Dv as the vertical width of the light beam 91 and a light flux transversal width Dh as the horizontal width are incident to the objective lens 29. Thus, it is possible to prevent that the thickness of an optical part in the optical path is increased since the light flux longitudinal width Dv of the light beam 91 is large. Further, the entire optical pickup 20 can be thinly made.

At this time, in the optical pickup 20, the light beam 91 is not widened in the vertical direction (unillustrated ceiling portion and bottom portion) of the optical pickup 20 as much as possible until its limit, but a clearance is positively arranged between a light flux upper end of the light beam 91 and the ceiling portion, and is also positively arranged between a light flux lower end of the light beam 91 and the bottom portion. Thus, it is prevented that the upper and lower ends of the light beam 91 are turned down by movement of the optical path due to vibration, etc. Thus, reliability of the optical pickup 20 with respect to the movement of the optical path can be improved.

Figure 3:
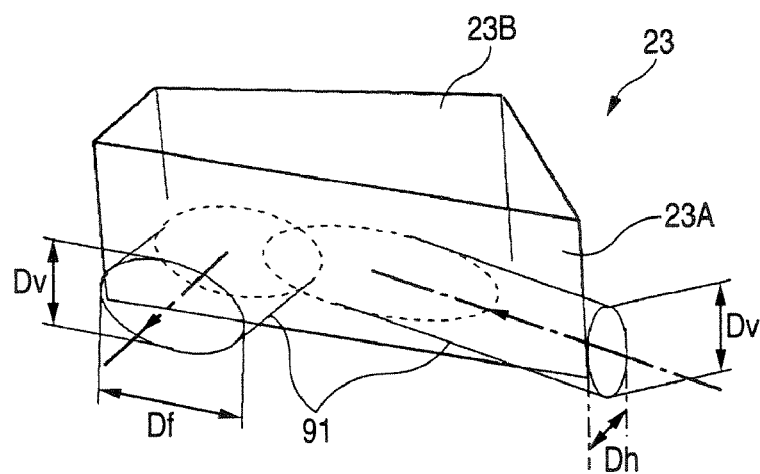
FIG. 3 is a schematic view showing extension of the horizontal direction (perspective view).
Figure 4:
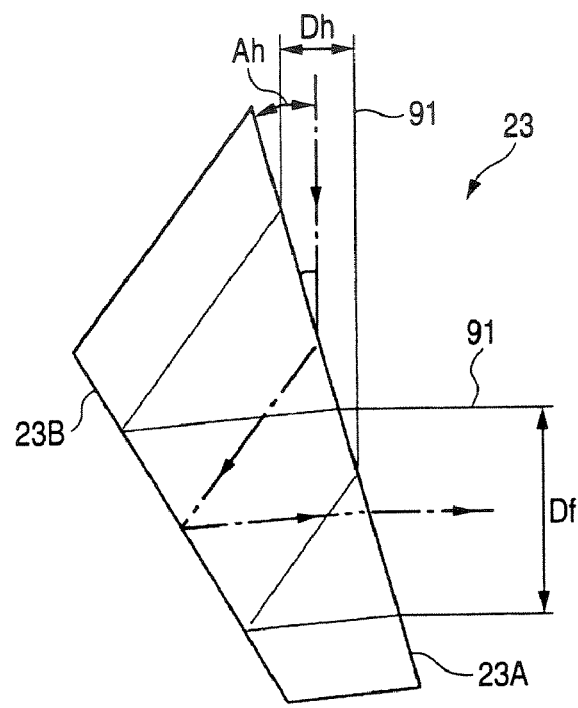
FIG. 4 is a schematic view showing the extension of the horizontal direction (top view).

As shown in FIGS. 3 and 4, in the refracting prism 23, a reflection face 23B is slightly inclined with respect to an incident-emitting face 23A, and the incident-emitting face 23A and the reflection face 23B are formed so as to cross at an acute angle on its extension line. The refracting prism 23 is arranged such that an incident angle Ah of the horizontal direction of the light beam 91 with respect to the incident-emitting face 23A becomes small.

Therefore, the refracting prism 23 greatly extends only the horizontal direction of the light beam 91 by the incident-emitting face 23A without changing the vertical direction of the longitudinal light beam 91. Further, the refracting prism 23 reflects and emits the light beam 91 by the reflection face 23B.

As this result, the refracting prism 23 extends the light flux transversal width Dh of the incident longitudinal light beam 91 until the final light flux diameter Df, and sets this light beam 91 to be oblong. The refracting prism 23 then refracts this light beam 91 by 90°, and emits this light beam 91, and makes this light beam 91 incident to a beam splitter 25 through a grating 24 (FIG. 2).

The beam splitter 25 transmits a large portion of the incident light beam 91 and makes this large portion incident to a rising prism 28 through a ¼ wavelength plate 27. The beam splitter 25 reflects one portion of the light beam 91, and makes this one portion incident to a front monitor 26 for monitoring laser power.

Figure 5:
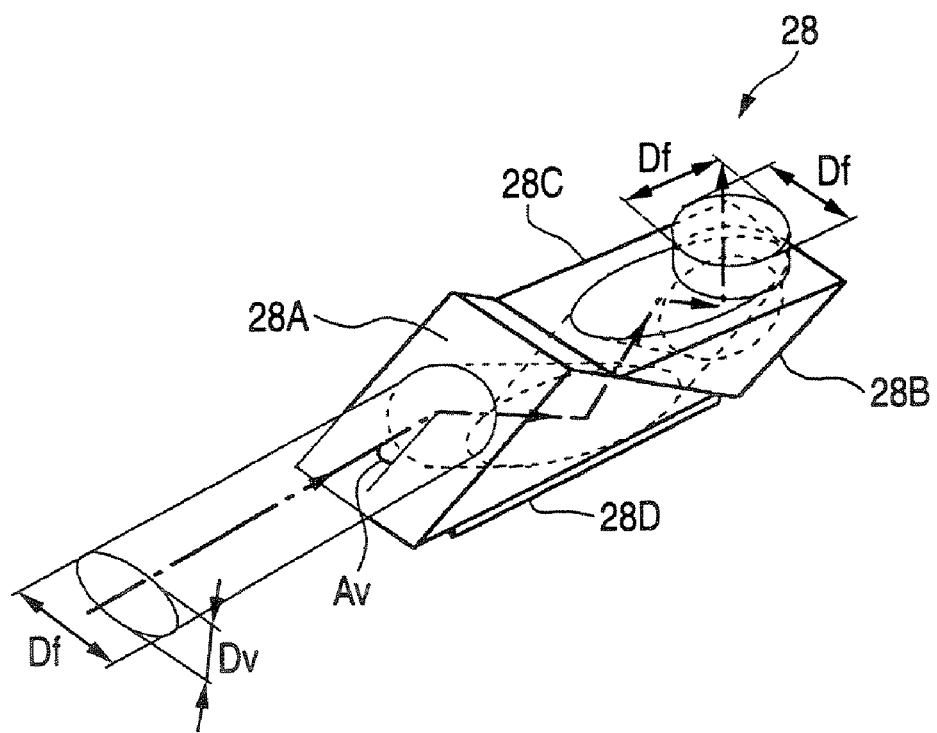
FIG. 5 is a schematic view showing shaping of a light beam using a rising prism.

As shown in FIG. 5, the rising prism 28 is set such that an incident angle Av of the vertical direction of the light beam 91 with respect to an incident face 28A becomes small. Therefore, only the light flux longitudinal width Dv of the incident oblong light beam 91 is extended until the final light flux diameter Df, and this light beam 91 is shaped in a round circle shape. The light beam 91 is then refracted 90° upward, and is incident to the objective lens 29 (FIG. 2).

At this time, the rising prism 28 reflects the incident light beam 91 plural times, and finally refracts the light beam 91 90°. Therefore, no extended light beam 91 is advanced in the horizontal direction, and the height of the light beam 91 within the rising prism 28 can be limited. The detailed construction of this rising prism 28 will be described later.

The objective lens 29 (FIG. 2) converges the incident light beam 91, and irradiates this light beam 91 to the optical disc 100.

On the other hand, similar to the laser diode 21 for DVD, the laser diode 30 for CD emits the laser beam, and makes this laser beam incident to a beam splitter 34 as the light beam 92 through a collimator lens 31, a refracting prism 32 and a grating 33.

The beam splitter 34 transmits the incident light beam 92 and makes this light beam 92 incident to the beam splitter 25. The beam splitter 25 transmits one portion of the light beam 92, and makes this one portion incident to the front monitor 26. Further, the beam splitter 25 reflects a large portion of the light beam 92 and makes this large portion incident to the ¼ wavelength plate 27. Similar to the light beam 91 for DVD, the beam splitter 25 then irradiates the light beam 92 to the optical disc 100 through the rising prism 28 and the objective lens 29.

Further, the objective lens 29 receives the reflection light beam 93 provided by reflecting the light beams 91, 92 on the optical disc 100, and makes this reflection light beam 93 incident to the rising prism 28. The rising prism 28 converts the light flux of the incident reflection light beam 93 from a round circle shape to an oblong shape, and makes this light flux incident to the beam splitter 25 through the 1/4 wavelength plate 27.

The beam splitter 25 reflects the reflection light beam 93, and refracts this reflection light beam 93 90° so that the refracted reflection light beam 93 is incident to the beam splitter 34. The beam splitter 34 reflects the incident reflection light beam 93, and makes this reflection light beam 93 incident to a collimator lens 35.

The collimator lens 35 converges the incident reflection light beam 93, and makes this reflection light beam 93 incident to a photo detector 37 through a multi-lens 36 for canceling astigmatism. The photo detector 37 photoelectrically converts the reflection light beam 93 and generates a light receiving signal, and supplies this light receiving signal to the signal processing section 16 (FIG. 1).

Thus, in the optical pickup 20, the light beams 91, 92 emitted by the laser diodes 21, 30 and having a large divergent angle in the vertical direction are converted into parallel light by the collimator lens 22 before these light beams 91, 92 are enlarged until the final light flux diameter Df. Thus, the light flux longitudinal width Dv of the light beams 91, 92 can be restricted so as to be small. In the optical pickup 20, only the light flux transversal width Dh is extended by the refracting prisms 23, 32 in advance until the final light flux diameter Df. The light flux longitudinal width Dv of the light beams 91, 92 is extended by the rising prism 28 as a former stage of the objective lens 29 until the final light flux diameter Df. Simultaneously, the light beam is reflected plural times within the rising prism 28. Thus, the light beam 91 of the horizontal direction is deflected in the upward direction. Thus, the optical pickup 20 can lower a light flux upper end over the entire optical path of the light beams 91, 92 without advancing the light beams 91, 92 attaining the final light flux diameter Df in the vertical direction to the horizontal direction at no time. Therefore, the optical pickup 20 can be thinly made.

(3) Construction of Rising Prism

Figure 6:
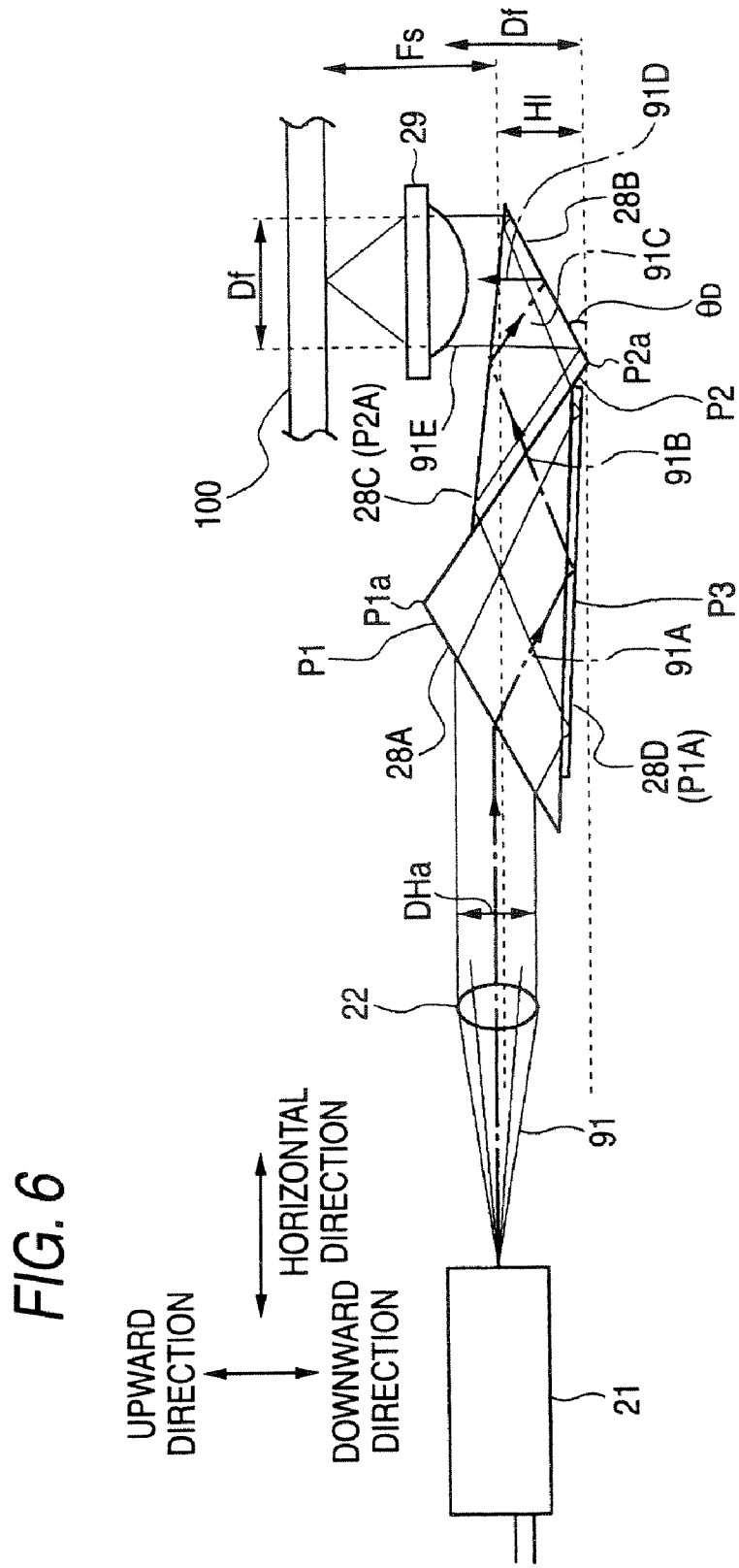
FIG. 6 is a schematic view showing an optical path within the rising prism.

Next, the above rising prism 28 will be explained by using FIG. 6. In the following description, for convenience of the explanation, the light beam 91 emitted from the laser diode 21 for DVD will be explained, and an explanation with respect to the light beam 92 having the same contents is omitted. In FIG. 6, the laser diode 21, the collimator lens 22 and the objective lens 29 are illustrated together to clarify the relation of the light flux of the light beam 91 and the rising prism 28, and other optical parts such as the refracting prism 23, etc. are omitted.

The rising prism 28 is constructed by a first prism P1 as a flat triangular prism, a second prism P2 slightly compacter than the first prism and formed as a flat triangular prism, and an achromatic plate P3 formed in a thin plate shape. For example, the rising prism 28 is formed by various kinds of plastic materials such as acrylic resin, polycarbonate resin, etc., glass, etc.

These two prisms (first prism P1 and second prism P2) are formed by the same material (e.g., refractive index n=1.5). On the other hand, the achromatic plate P3 is formed by a material (e.g., refractive index n=1.6) different from the material of these two prisms.

In the rising prism 28, one slanting face of the second prism P2 is stuck to one slanting face of this first prism P1 by an adhesive, etc. such that a vertex P1a of the first prism P1 is set to the upward direction, and a vertex P2a of the second prism P2 is set to the downward direction. Further, the rising prism 28 is formed by similarly sticking the achromatic plate P3 to a bottom face of the first prism P1.

At this time, a vertex P2a of the second prism P2 is stuck in a state slightly projected from the achromatic plate P3 stuck to the bottom face of the first prism P1. A ceiling side P2A of the second prism smaller in height than the first prism is arranged in a position lower than the vertex P1a of the first prism.

This rising prism 28 is arranged such that four faces (incident face 28A, rising reflection face 28B, reflection transmission face 28C and relay reflection face 28D) are located on the optical path of the light beam 91.

As mentioned above, the objective lens 29 is moved in the vertical direction (a direction approaching the optical disc or separated from the optical disc) over a predetermined focus stroke range to retrieve a focusing point of the optical disc. Therefore, the rising prism 28 is arranged in the downward direction of the objective lens 29 in a state for securing the thickness of the above objective lens 29 and an objective lens space Fs as a space of the focus stroke range such that the light beam 91 is incident at about the center of the incident face 28A, and the rising reflection face 28B is opposed to the objective lens 29 through the reflection transmission face 28C.

Accordingly, when the light beam 91 is incident from the incident face 28A, this rising prism 28 reflects the light beam 91 in an order of the relay reflection face 28D, the reflection transmission face 28C and the rising reflection face 28B. Thereafter, this light beam 91 is transmitted by the reflection transmission face 28C. Thus, the light beam 91 is emitted toward the objective lens 29 located upward.

Concretely, when the light beam 91 is incident through the ¼ wavelength plate 27 (FIG. 2), the rising prism 28 transmits the light beam 91 by the incident face 28A (FIG. 6), and makes this light beam 91 incident as an incident light beam 91A. At this time, the incident face 28A is set such that the incident angle Av is small as mentioned above (29° in this embodiment mode). Therefore, the light beam 91 is refracted downward toward the relay reflection face 28D, and the light beam 91 having the light flux longitudinal width Dv before the incidence is greatly extended in the vertical direction.

The relay reflection face 28D reflects the incident light beam 91A from the incident face 28A upward toward the reflection transmission face 28C as a first reflection light beam 91B. At this time, the relay reflection face 28D reflects the incident light beam 91A provided by moving the entire light flux to a low position by once refracting this light flux downward in a state lowered until a position lower than a lower end of the light beam 91 before the incidence.

At this time, the incident light beam 91A and the first reflection light beam 91B are set so as to cancel the difference in refractive index between the light beam 91 for DVD and the light beam 92 for CD having different wavelengths by passing the achromatic plate P3 of a material different from that of the two prisms. The incident light beam 91A and the first reflection light beam 91B are also set so as to conform emitting angles and emitting positions of the light beams 91 and 92 when the light beams are emitted from the rising prism 28 later. As mentioned above, since the first prism P1 and the second prism P2 are constructed by the same material, no light beam is refracted at the boundary of the two prisms.

This relay reflection face 28D is slightly slantingly arranged such that the incident angle of the incident light beam 91A becomes small with respect to the horizontal direction (2° in this embodiment mode). Thus, in comparison with a case in which the relay reflection face 28D is horizontally arranged, a rising angle of the first reflection light beam 91B with respect to the horizontal direction is set to be gentle, and the optical path of the first reflection light beam 91B can be restricted to a low position. Therefore, the reflection transmission face 28C for reflecting this first reflection light beam 91B can be set to a lower position, and the height of the second prism P2 as a portion opposed to the objective lens 29 among the rising prism 28 can be reduced.

With respect to the reflection transmission face 28C, the incident angle of the first reflection light beam 91B from the relay reflection face 28D is less than a critical angle as the boundary of reflection and transmission. Therefore, this first reflection light beam 91B is reflected downward toward the rising reflection face 28B as a second reflection light beam 91C. At this time, with respect to the reflection transmission face 28C, it is sufficient to reflect the first reflection light beam 91B reflected from a position lower than a light flux lower end of the light beam 91 before the incidence. Therefore, it is possible to reflect the first reflection light beam 91B in a position lower than an upper end of the light flux of the light beam 91.

The rising reflection face 28B reflects the second reflection light beam 91C from the reflection transmission face 28C toward the reflection transmission face 28C as a third reflection light beam 91D so as to become a direction approximately perpendicular to the objective lens 29. In this embodiment mode, a rising reflection angle θD as an angle of this rising reflection face 28B with respect to the horizontal direction is set to become 27.13°.

The reflection transmission face 28C transmits the third reflection light beam 91D since the incident angle of the third reflection light beam 91D reflected from the rising reflection face 28B is a critical angle or more. Further, the reflection transmission face 28C refracts this third reflection light beam 91D so as to be perpendicular to the objective lens 29. Thus, an emitting light beam 91E is emitted from the rising prism 28.

Here, this reflection transmission face 28C is slightly slantingly set with respect to the horizontal direction such that the incident angle of the first reflection light beam 91B from the relay reflection face 28D becomes large (6° in this embodiment mode). Thus, in comparison with a case set to the horizontal direction, the reflection transmission face 28C can lower a portion opposed to the objective lens 29 on the reflection transmission face 28C to a lower position. Further, a space generated by this lowering can be practically used as one portion of the objective lens space Fs. Therefore, the height of the vicinity of the objective lens 29 can be reduced.

Further, the reflection transmission face 28C is set to be slightly inclined on an advancing direction side of the incident light beam 91A with respect to the horizontal direction. Thus, in comparison with a case set to the horizontal direction, a descent angle of the reflected second reflection light beam 91C with respect to the horizontal direction can be steeply set, and the rising reflection angle θD of the rising reflection face 28B can be set to be smaller. This rising reflection angle θD is also influenced by a refraction angle of the emission light beam 91B due to this reflection transmission face 28C. However, this influence can be set to be extremely small since the inclination angle of the reflection transmission face 28C is a small angle such as 6° in this embodiment mode.

As this result, in the rising prism 28, for example, this light beam 91 can be emitted as the emission light beam 91E in a state in which the light beam 91 having 1.36 mm in light flux longitudinal width Dv is extended to 2.28 mm in final light flux diameter Df. Further, an opposite portion prism height H1 as the height of the rising prism 28 of a portion opposed to the objective lens required from a bottom portion of the optical pickup 20 to the objective lens space Fs can be shortened until 1.5 mm greatly smaller than the final light flux diameter Df=2.28 mm. Thus, the emission light beam 91E can be emitted from a position further lower than the upper end of the light flux of the light beam 91 reduced in size in the vertical direction.

The refractive index of the material constituting the above rising prism 28, and the angles of the incident face 28A, the rising reflection face 28B, the reflection transmission face 28C and the relay reflection face 28D may be suitably selected in accordance with various kinds of conditions such as an extension ratio of the light beam 91, storing spaces of the horizontal direction and the vertical direction, etc.

Thus, in the rising prism 28, the light beam 91 long in the horizontal direction is shaped in a round circle shape by extending this light beam 91 in the vertical direction. Further, the incident light beam 91A incident from the incident face 28A is once reflected on the relay reflection face 28D before this incident light beam 91A is reflected toward the reflection transmission face 28C. Thus, the incident light beam 91A can be reflected on the reflection transmission face 28C in a position lower than the light flux upper end of the light beam 91. Further, the relay reflection face 28D is inclined such that the incident angle of the incident light beam 91A becomes gentle. Thus, the position of the reflection transmission face 28C is further lowered and the opposite portion prism height H1 can be shortened.

(4) Operation and Effect

In the above construction, the optical pickup 20 of the optical disc device 10 emits the light beam 91 having a large divergent angle in the vertical direction to the horizontal direction parallel to an information recording face of the optical disc 100 by the laser diode 21. The light beam 91 is converted into parallel light by the collimator lens 22 such that the light flux longitudinal width Dv and the light flux transversal width Dh of the light beam 91 become smaller than the final light flux diameter Df as a light flux width at the incident time to the objective lens. The light flux transversal width Dh of the light beam 91 is extended by the refracting prism 23 as an extending prism until the final light flux diameter Df. Thus, the light beam 91 is set to be oblong. The optical pickup 20 then extends the light flux longitudinal width Dv of the light beam 91 until the final light flux diameter Df by the rising prism 28 arranged at the former stage of the objective lens 29 for irradiating the light beam 91 to the optical disc 100. Further, the light beam 91 is refracted within this rising prism 28, and is incident to the objective lens 29 located in the upward direction.

Thus, the optical pickup 20 can be set to a state in which the light flux longitudinal width Dv of the light beam 91 having a large divergent angle in the vertical direction is positively reduced during the incidence to the rising prism 28 just before the objective lens 29. Since the thickness of an optical part in the optical path can be reduced, the entire optical pickup 20 can be thinly made.

Further, the optical pickup 20 reflects the incident light beam 91A as the light beam 91 incident from the incident face 28A plural times (three times) within the rising prism 28. Thus, it is possible to set an optical path upper end of the incident light beam 91A extended until the final light flux diameter Df such that this optical path upper end is always inclined with respect to the horizontal direction and does not exceed the light flux upper end of the light beam 91 in the upward direction before the incidence. Thus, the rising prism 28 can be thinly made.

Further, the rising prism 28 of the optical pickup 20 is set such that the inclination angle (2°) of the relay reflection face 28D with respect to the horizontal direction becomes smaller than the inclination angle (6°) of the reflection transmission face 28C, i.e., these two faces are converged toward the advancing direction of the incident light beam 28A.

Thus, in comparison with a case in which the relay reflection face 28D and the reflection transmission face 28C are set to be parallel, the rising prism 28 relatively steeply sets an incident reflection angle of the light beam 91 (incident light beam 91A and first to third reflection light beams 91B to 91D) within the rising prism 28. The rising prism 28 can also reduce the rising reflection angle θD of the rising reflection face 28B with respect to the horizontal direction mainly determined by the incident angle of the second reflection light beam 91C. Further, the rising prism 28 can reduce a moving distance of the light beam 91 within the rising prism 28 with respect to the horizontal direction. Thus, the size of the rising prism 28 with respect to the horizontal direction can be reduced.

Further, the rising prism 28 once reflects the incident light beam 91A downward. Thus, differing from the rising prism 6 (FIG. 8) for greatly inclining the former reflection transmission face 28C, the reflection transmission face 28C itself can be set to a low position. Therefore, its inclination angle can be freely set.

Thus, in comparison with the former rising prism 6, the rising prism 28 can set the reflection transmission face 28C to a small angle in the horizontal direction, and can efficiently shape the light beam 91 without again greatly shortening the emission light beam 91B extended by the incident face 28A by refraction in emission from the reflection transmission face 28C.

Further, in the rising prism 28, four faces are independently arranged in the optical path of the incident light beam 91A. Therefore, the angles of these four faces can be freely combined, and the degree of freedom in design can be improved in comparison with the former rising prisms 4 and 6 for reflecting the light beam by using three faces. Further, it is possible to design the rising prism 28 in accordance with uses and purposes in which the light beam 91 is more greatly extended and the rising prism 28 is made thinner, etc.

Further, the rising prism 28 is formed by combining the first prism P1 and the second prism P2 as two triangular prisms. Therefore, the rising prism 28 formed in a complicated shape can be simply formed by a simple process in which the first prism P1 and the second prism P2 formed in a simple shape in accordance with the optical path of the incident light beam 91A are merely stuck.

Further, the rising prism 28 is used in the optical pickup 20 in which the height of the laser diode 21 and the height of the optical path upper end of the light beam 91 are reduced. Thus, the height of another optical part located in the optical path of the light beam 91 can be reduced together as well as the rising prism 28. Therefore, the effect of greatly reducing the opposite portion prism height H1 can be shown at its maximum. Thus, the entire optical pickup 20 can be greatly thinly made.

In accordance with the above construction, the optical pickup 20 of the optical disc device 10 restricts the light flux of the light beam 91 having a large divergent angle in the vertical direction so as to be small in the vertical direction. Further, the optical pickup 20 extends the vertical direction of the light flux by the rising prism 28 as a former stage of the objective lens 29. Therefore, the height of the entire optical path can be reduced so that the optical pickup 20 can be thinly made.

(5) Other Embodiment Modes

In the above embodiment mode, the case for sticking the two triangular prisms (P1 and P2) has been described. However, the invention is not limited to this case. For example, the achromatic plate P3 may be also stuck to a prism as a single body.

Further, in the above embodiment mode, the case for inclining the reflection transmission face 28C by 6° has been described. However, the invention is not limited to this case, but the reflection transmission face 28C may be also arranged in the horizontal direction. Thus, differing from the former optical pickup 7, it is possible to prevent that the light beams 91, 92 are refracted on the reflection transmission face 28C and the light fluxes of the light beams 91, 92 specially extended on the incident face 28A are again shortened. Thus, the light beams 91, 92 can be further effectively extended.

Further, in the above embodiment mode, the case for canceling chromatic aberration by using the achromatic plate P3 has been described. However, the invention is not limited to this case, but this achromatic plate P3 is not necessarily required.

Further, in the above embodiment mode, the case for slightly inclining the relay reflection face 28D has been described. However, the invention is not limited to this case. For example, the relay reflection face 28D may be also arranged in the horizontal direction, and may be also arranged at a steeper angle.

Further, in the above embodiment mode, the case for reflecting the incident light beam 91A three times within the rising prism 28 has been described, but the invention is not limited to this case. For example, the incident light beam 91A incident to the upper direction by the incident face 28A is once reflected on the upper face of the rising prism 28 and is then reflected on the relay reflection face 28D so that the incident light beam 91A may be also reflected four times or more within the rising prism 28.

Further, in the above embodiment mode, the case for using no achromatic plate in the refracting prism 23 has been described, but the invention is not limited to this case. For example, when the laser light beam of two wavelengths or more is emitted from one laser diode 21 and is incident to the same optical path, chromatic aberration can be canceled by sticking the achromatic plate to the reflection face 23B of the refracting prism 23.

Further, in the above embodiment mode, the case for extending the transversal direction of the light beam 91 by using the refracting prism 23 has been described, but the invention is not limited to this case. For example, the transversal direction of the light beam 91 may be also extended by using a cylindrical lens.

Further, in the above embodiment mode, the case for extending the light flux of the light beam 91 in the vertical direction by the rising prism 28 has been described. However, the invention is not limited to this case, but the light beam shaped in a round circular shape in advance may be also incident. In this case, the effect of thinly making the rising prism 28 can be also sufficiently obtained.

Further, in the above embodiment mode, the case for being able to get access to CD and DVD as the optical disc 100 has been described in the optical pickup 20, but the invention is not limited to this case. For example, the invention may be also set so as to cope with three kinds of BD (Blu-ray Disc which is a registered trademark), CD and DVD, and there is particularly no limit with respect to kinds and combinations of the optical disc 100.

Further, the above embodiment mode has been described with respect to the case in which the optical pickup 20 as an optical pickup is constructed by the laser diode 21 as a light source, the collimator lens 22 as a collimator lens, the refracting prism 23 as an extending portion, the rising prism 28 as a rising prism, and the objective lens 29 as an objective lens. However, the invention is not limited to this case, but the optical pickup of the invention may be also constructed by a light source, a collimator lens, an extending portion, a rising prism and an objective lens formed by various kinds of other constructions.

Further, the above embodiment mode has been described with respect to the case in which the rising prism 28 is constructed by the incident face 28A as an incident face, the rising reflection face 28B as a rising reflection face, the reflection transmission face 28C as a reflection transmission face, and the relay reflection face 28D as a relay reflection face. However, the invention is not limited to this case, but the rising prism of the invention may be also constructed by an incident face, a rising reflection face, a reflection transmission face and a relay reflection face set to various kinds of other angles, directions and refractive indexes.

For example, the optical pickup, the optical disc device and the rising prism of the invention can be utilized in an optical disc drive of a portable type and a personal computer of a notebook type.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup device comprising:
   a light source for emitting a light beam having a divergent angle large in a vertical direction perpendicular to an information recording face of an optical disc and small in a parallel direction;
   a collimator lens for converting the light beam emitted from the light source into parallel light;
   an objective lens for converging the light beam to the optical disc;
   an extending portion in which a light flux transversal width as the width of the parallel direction with respect to the information recording face of the optical disc of the light beam converted into the parallel light by the collimator lens is extended until a final light flux diameter as the diameter of the light beam at an incident time to the objective lens; and
   a prism in which a light flux longitudinal width as the width of a direction perpendicular to the information recording face of the optical disc of the extended light beam is extended until the final light flux diameter, and the light beam is emitted to the objective lens;
   wherein the collimator lens converts the light beam into the parallel light such that the light flux longitudinal width and the light flux transversal width in the light beam become smaller than the final light flux diameter.

2. The optical pickup device according to claim 1, wherein the prism has:
   an incident face for refracting the incident light beam and extending its light flux longitudinal width;
   a relay reflection face for receiving, from the incident face, the refracted light beam and for reflecting the refracted light beam upward;
   a reflection transmission face, for receiving, from the relay reflection face, the reflected light beam and for reflecting the light beam downward, in a position lower than an upper end of the incident light beam; and
   a rising reflection face that receives, from the reflection transmission face, the reflected light beam and on which the light beam is reflected upward through the reflection transmission face to the objective lens.

3. The optical pickup device according to claim 2, wherein the relay reflection face is inclined in a direction for reducing an incident angle of the refracted light beam on the relay reflection face.

4. An optical disc device comprising:
   a light source for emitting a light beam having a divergent angle large in a vertical direction perpendicular to an information recording face of an optical disc and small in a parallel direction;
   a collimator lens for converting the light beam emitted from the light source into parallel light;
   an objective lens for converging the light beam to the optical disc;
   an extending portion in which a light flux transversal width as the width of the parallel direction with respect to the information recording face of the optical disc of the light beam converted into the parallel light by the collimator lens is extended until a final light flux diameter as the diameter of the light beam at an incident time to the objective lens; and
   a prism in which a light flux longitudinal width as the width of a direction perpendicular to the information recording face of the optical disc of the extended light beam is extended until the final light flux diameter, and the light beam is emitted to the objective lens;
   wherein the collimator lens converts the light beam into the parallel light such that the light flux longitudinal width and the light flux transversal width in the light beam become smaller than the final light flux diameter.

5. A prism for emitting a light beam incident in a parallel direction to an upward direction perpendicular to the parallel direction, and comprising:
   an incident face for refracting the incident light beam;
   a relay reflection face for receiving, from the incident face, the refracted light beam and for reflecting the refracted light beam upward;
   a reflection transmission face for receiving, from the relay reflection face, the reflected light beam and for reflecting the light beam downward, in a position lower than an upper end of the incident light beam; and
   a rising reflection face that receives, from the reflection transmission face, the reflected light beam and on which the light beam is reflected upward through the reflection transmission face in the upward direction;
   wherein the relay reflection face is inclined in a direction for reducing an incident angle of the refracted light beam on the relay reflection face.

6. The prism according to claim 5, wherein the prism is formed by sticking plural prisms.

7. The prism according to claim 5, wherein the reflection transmission face is inclined in a direction for increasing an incident angle of the light beam on the relay reflection face.

8. An optical pickup device comprising:

a light source for emitting a light beam having a divergent angle large in a vertical direction perpendicular to an information recording face of an optical disc and small in a parallel direction;

a prism having an incident face for refracting the incident light beam;

a relay reflection face for receiving, from the incident face, the refracted light beam and for reflecting the refracted light beam upward;

a reflection transmission face for receiving, from the relay reflection face, the reflected light beam and for reflecting the light beam downward, in a position lower than an upper end of the incident light beam; and a rising reflection face that receives, from the reflection transmission face, the reflected light beam and on which the light beam is reflected upward through the reflection transmission face in the upward direction; and an objective lens for irradiating the emitted light beam to the optical disc;

wherein the relay reflection face is inclined in a direction for reducing an incident angle of the refracted light beam on the relay reflection face.

9. An optical disc device comprising:

a light source for emitting a light beam having a divergent angle large in a vertical direction perpendicular to an information recording face of an optical disc and small in a parallel direction;

a prism having an incident face for refracting the incident light beam;

a relay reflection face for receiving, from the incident face, the refracted light beam and for reflecting the refracted light beam upward;

a reflection transmission face for receiving, from the relay reflection face, the reflected light beam and for reflecting the light beam downward, in a position lower than an upper end of the incident light beam; and a rising reflection face that receives, from the reflection transmission face, the reflected light beam and on which the light beam is reflected upward through the reflection transmission face in the upward direction;

an objective lens for irradiating the emitted light beam to the optical disc; and a drive section for moving the objective lens in a diametrical direction of the optical disc;

wherein the relay reflection face is inclined in a direction for reducing an incident angle of the refracted light beam on the relay reflection face.

10. The optical pickup device according to claim 1, wherein the extending portion extends only the light flux traversal width of the light beam until the fixed light final diameter.

11. The optical pickup device according to claim 1, wherein the prism extends only the light flux longitudinal width of the light beam until the final light flux diameter.

12. The optical pickup device according to claim 4, wherein the extending portion extends only the light flux traversal width of the light beam until the final light flux diameter.

13. The optical pickup device according to claim 4, wherein the prism extends only the light flux longitudinal width of the light beam until the final light flux diameter.

* * * * *